June 30, 1970  N. M. PITULEY  3,517,582
ALBADA VIEWFINDER
Filed June 12, 1968
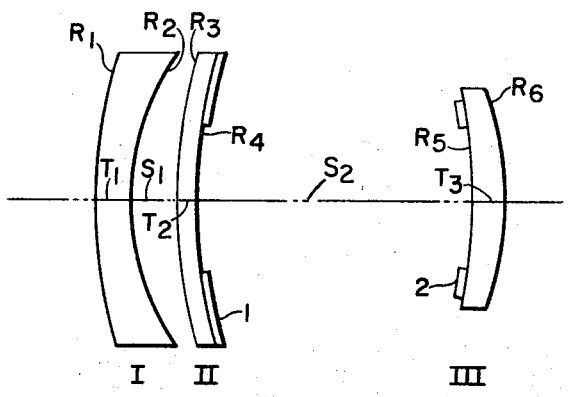
NICHOLAS M. PITULEY
INVENTOR.
BY William F. Delany
Robert W. Hampton
ATTORNEYS

United States Patent Office 3,517,582
Patented June 30, 1970

3,517,582
ALBADA VIEWFINDER
Nicholas M. Pituley, Rochester, N.Y., assignor to Eastman Kodak Company, Rochester, N.Y., a corporation of New Jersey
Filed June 12, 1968, Ser. No. 736,497
Int. Cl. G03b 13/02
U.S. Cl. 88—1.5                              2 Claims

ABSTRACT OF THE DISCLOSURE

An Albada viewfinder comprising a negative objective and a positive eyepiece between which is located a positive meniscus element having on its rear surface a mirror for forming a virtual image of a reticle mark.

BACKGROUND OF THE INVENTION

This invention relates to Albada-type viewfinders, and more particularly to Albada viewfinders having three elements with a reflective coating on a portion of a surface of the middle element for forming an image of a reticle.

Projected frame viewfinders are well known and are often referred to as Albada viewfinders. In such systems a virtual image of a reticle line is projected at infinity by a mirror to provide a field frame appearing in the plane of the viewed object. Such projected frame systems are particularly adapted for use in reversed-Galilean viewfinders, in which a negative objective forms a virtual image of the field which is viewed through an eyepiece. Since the virtual image appears in front of the system, a frame cannot be located in the image plane. The Albada viewfinder solves this problem by projecting a frame image in the virtual image plane of the objective. The frame projecting means is a curved mirror that creates a virtual image substantially at infinity of a reflective reticle, which is illuminated through the viewfinder objective. For some applications the viewfinder elements are sufficiently close to each other for the reticle to be located on the eyepiece element and for the reflective surface to be a semi-reflective coating on the rear surface of the negative objective. However, there are many other applications of this type of viewfinder with a greater separation between the two elements in which case either the reticle or the reflective surface is usually supported independently of the objective or the eyepiece. The independent mounting of the reflecting surface or the reticle requires rather close alignment tolerances to avoid interfering with the viewfinder optics and to insure framing of the field. For example, one method of mounting the reflective surface independently of the optical elements is to provide a curved mirror having a central portion cut out to permit the passage of viewfinder image light. However, the manufacture of such mirrors is complicated by their tendency to warp. On the other hand, if the mirror is coated on a transparent plate to avoid warping, the viewfinder system is affected. These difficulties can be overcome by providing an additional lens element in the viewfinder with the mirror coated on one of its surfaces.

SUMMARY OF THE INVENTION

This invention provides an Albada-type viewfinder comprising a negative objective and a positive eyepiece, between which is located an additional lens element having a reflective coating on a portion of the rear surface thereof. This additional element provides a solid surface on which the reflective mirror can be coated without warping problems, as well as providing additional parameters with which to improve the optical characteristics of the system. For example, the additional middle element may be employed to change the magnification of the basic system, or the power of the middle element may be used to compensate for its own presence in the system so that it may be included without increasing aberrations or extending the overall length of the viewfinder.

BRIEF DESCRIPTION OF THE DRAWINGS

The drawing is a cross-sectional view of an Albada-type viewfinder according to one embodiment of the invention.

DETAILED DESCRIPTION OF THE DRAWING

In the drawing a reversed-Galilean viewfinder is shown having a negative meniscus objective I and a positive meniscus eyepiece III, between which is located a positive meniscus element II. A mirror 1 is coated on the rear surface of the middle lens element II, which is concave toward the eyepiece III. Near the eyepiece is located a reticle 2 in the focal plane of the mirror 1. For simplicity the reticle may be mounted on the eyepiece. The mirror 1 may be a semi-reflective coating over the entire lens surface or it may be a fully reflective coating on a peripheral portion of the surface.

Examples of viewfinders according to the invention are given in the tables below wherein R, T and S refer respectively to the radii of curvature of the lens and mirror surfaces, the thicknesses of the lens elements and the spacings between the elements, numbered by subscript from front to rear and wherein all three lens elements can be made of Plexiglas having an index of refraction for the D line of the spectrum of substantially 1.49 and a power of dispersion of substantially 57.4.

EXAMPLE 1
Magnification = .654×

| Elements | Radii (inches) | Thicknesses and Spacing (inches) |
|---|---|---|
| Objective I | $R_1 = 3.7102$ | $T_1 = .060$ |
|  | $R_2 = .6819$ |  |
|  |  | $S_1 = .125$ |
| Lens II | $R_3 = 2.1739$ | $T_2 = .040$ |
|  | $R_4 = 2.2222$ |  |
|  |  | $S_2 = .650$ |
| Eyepiece III | $R_5 = -10.0256$ | $T_3 = .090$ |
|  | $R_6 = -1.1679$ |  |

The viewfinder in Example 1 covers a half-field angle of 20.9° and has a long eye relief of 1.000 inch.

EXAMPLE 2
Magnification = .644×

| Elements | Radii (inches) | Thicknesses and spacings (inches) |
|---|---|---|
| Objective I | $R_1 = 6.260$ | $T_1 = .102$ |
|  | $R_2 = 1.150$ |  |
|  |  | $S_1 = .220$ |
| Lens II | $R_3 = 3.823$ | $T_2 = .070$ |
|  | $R_4 = 3.9083$ |  |
|  |  | $S_2 = 1.204$ |
| Eyepiece III | $R_5 = -17.456$ | $T_3 = .157$ |
|  | $R_6 = -2.0542$ |  |

The viewfinder in Example 2 covers a half-field angle of 19.3° and has a long eye relief of .80 inch.

The invention has been described in detail with particular reference to preferred embodiments thereof, but it will be understood that variations and modifications can be effected within the spirit and scope of the invention as described hereinabove and as defined in the appended claims.

I claim:

1. An Albada-type viewfinder lens system comprising from front to rear a negative meniscus objective, a positive meniscus middle element concave toward the rear and a rear positive meniscus eyepiece, wherein the lens elements have substantially the following characteristics and spatial relations in which the lens elements are numbered from the front, R, T and S refer respectively to the radii of curvature of the lens surfaces, the thicknesses of the lens elements and the spacings between the elements, numbered by subscript from front to rear, and wherein the lenses have an index of refraction for the D line of substantially 1.49 and a power of dispersion of substantially 57.4:

| Elements | Radii (inches) | Thicknesses and Spacings (inches) |
|---|---|---|
| Objective I | $R_1=3.71$ | $T_1=.06$ |
| | $R_2=.68$ | $S_1=.13$ |
| Lens II | $R_3=2.17$ | $T_2=.04$ |
| | $R_4=2.22$ | $S_2=.65$ |
| Eyepiece III | $R_5=-10.03$ | $T_3=.09$ |
| | $R_6=-1.17$ | |

2. An Albada-type viewfinder lens system comprising from front to rear a negative meniscus objective, a positive meniscus middle element concave toward the rear and a rear positive meniscus eyepiece, wherein the lens elements have substantially the following characteristics and spatial relations in which the lens elements are numbered from the front, R, T and S refer respectively to the radii of curvature of the lens surfaces, the thicknesses of the lens elements and the spacings between the elements, numbered by subscript from front to rear, and wherein the lenses have an index of refraction for the D line of substantially 1.49 and a power of dispersion of substantially 57.4:

| Elements | Radii (inches) | Thicknesses and Spacings (inches) |
|---|---|---|
| Objective I | $R_1=6.26$ | $T_1=.10$ |
| | $R_2=1.15$ | $S_1=.22$ |
| Lens II | $R_3=3.82$ | $T_2=.07$ |
| | $R_4=3.91$ | $S_2=1.20$ |
| Eyepiece III | $R_5=-17.46$ | $T_3=.16$ |
| | $R_6=-2.05$ | |

References Cited

UNITED STATES PATENTS

| | | | |
|---|---|---|---|
| 2,923,196 | 2/1960 | Papke | 88—1.5 |
| 3,024,691 | 3/1962 | Papke | 88—1.5 |
| 3,240,107 | 3/1966 | Prister | 88—1.5 |

FOREIGN PATENTS 1,100,453  2/1961  Germany.
915,118  1/1963  Great Britain.

RONALD L. WIBERT, Primary Examiner

F. L. EVANS, Assistant Examiner

U.S. Cl. X.R.

350—199, 225